US005519450A

United States Patent [19]
Urbanus et al.

[11] Patent Number: 5,519,450
[45] Date of Patent: May 21, 1996

[54] GRAPHICS SUBSYSTEM FOR DIGITAL TELEVISION

[75] Inventors: Paul M. Urbanus, Dallas; Donald B. Doherty, Richardson; Robert J. Gove, Plano; Gregory J. Hewlett, Garland; Stephen G. Kalthoff, Frisco, all of Tex.

[73] Assignee: Texas Instruments Incorporated, Dallas, Tex.

[21] Appl. No.: 339,098

[22] Filed: Nov. 14, 1994

[51] Int. Cl.[6] ............................................. H04N 9/76
[52] U.S. Cl. ........................ 348/600; 348/589; 348/563
[58] Field of Search ................................. 348/600, 589, 348/563, 569, 570, 564; 345/113, 115, 116; H04N 9/76, 9/74

[56] References Cited

U.S. PATENT DOCUMENTS

| | | | |
|---|---|---|---|
| 5,099,331 | 3/1992 | Truong | 345/113 |
| 5,274,753 | 12/1993 | Roskowski et al. | 345/116 |
| 5,406,306 | 4/1995 | Siann et al. | 348/589 |

*Primary Examiner*—Safet Metjahic
*Assistant Examiner*—Nina N. West
*Attorney, Agent, or Firm*—Julie L. Reed; James C. Kesterson; Charlie A. Brill

[57] ABSTRACT

An SLM-based digital display system (10) having a graphics display subsystem (13 and 18) for closed captioning, on-screen displays, and other graphics images that are overlaid on the video image. The graphics display subsystem (13 and 18) has a graphics processor (21) that prepares the graphics data, which is inserted into the video data path after video data processing and prior to a look-up table unit (27). A select logic unit (24) provides a control signal to a multiplexer (26) that selects between video data and graphics data for input to the look-up table unit (27). The look-up table unit (27) performs its mapping according to the type of data received, such as by linearizing video data or palletizing graphics data.

20 Claims, 2 Drawing Sheets ns
5,519,450

GRAPHICS SUBSYSTEM FOR DIGITAL TELEVISION

TECHNICAL FIELD OF THE INVENTION

This invention relates to digital display systems, and more particularly to a graphics subsystem for overlaying a graphics subdisplay on a main video image.

BACKGROUND OF THE INVENTION

Many of today's televisions, whether analog or digital, provide for various sorts of graphics subdisplays that may be overlaid over the main video image. For example, many television signals carry closed caption information so that a subdisplay of alphanumeric characters can be overlaid at the bottom of the screen. As another example, other television accommodate "on-screen" subdisplays of user controlled options such as channel or volume.

In digital television systems, providing graphics subdisplays is accomplished by inserting the subdisplay data into the video data path. However, depending on the point of insertion, this can result in less than optimal image quality. For example, if the graphics data is inserted so that it undergoes the same processing as the main video data, it may lose resolution.

SUMMARY OF THE INVENTION

One aspect of the invention is a graphics subsystem for a digital display system. The display system uses a spatial light modulator to display frames of video data, which may be overlaid with a graphics subdisplay. The graphics subsystem has a graphics processor, which receives input graphics data and processes it into graphics pixel data. On a pixel-by-pixel basis, the graphics processor assigns either an intensity value or a "transparent" value, with the latter indicating that no graphics data is to be displayed for that pixel. A graphics data memory stores the graphics data. On output from this memory, a select logic unit detects whether the value of each pixel is the "transparent" value and generates a corresponding control signal. On the main video data path, a multiplexer receives this graphics data as well as video data. The multiplexer selects between the video data and graphics data, depending on the value of the control signal. A look-up table receives the selected data from the multiplexer, and maps this data to display-ready data using a mapping function appropriate for that data. The data then continues on the main data path to a display memory and a spatial light modulator.

An advantage of the invention is that graphics data is inserted into the main data path at a point that optimizes the quality of the graphics subdisplay. These subdisplays retain the benefits of digital source data. Specifically, alphanumeric characters are sharper, as are edges and other features of graphic images. The graphics mapping function permits a palletized look-up for many more colors than would otherwise be available for 4-bit graphics data.

DETAILED DESCRIPTION OF THE INVENTION

Digital Display System Overview

Figure 1:
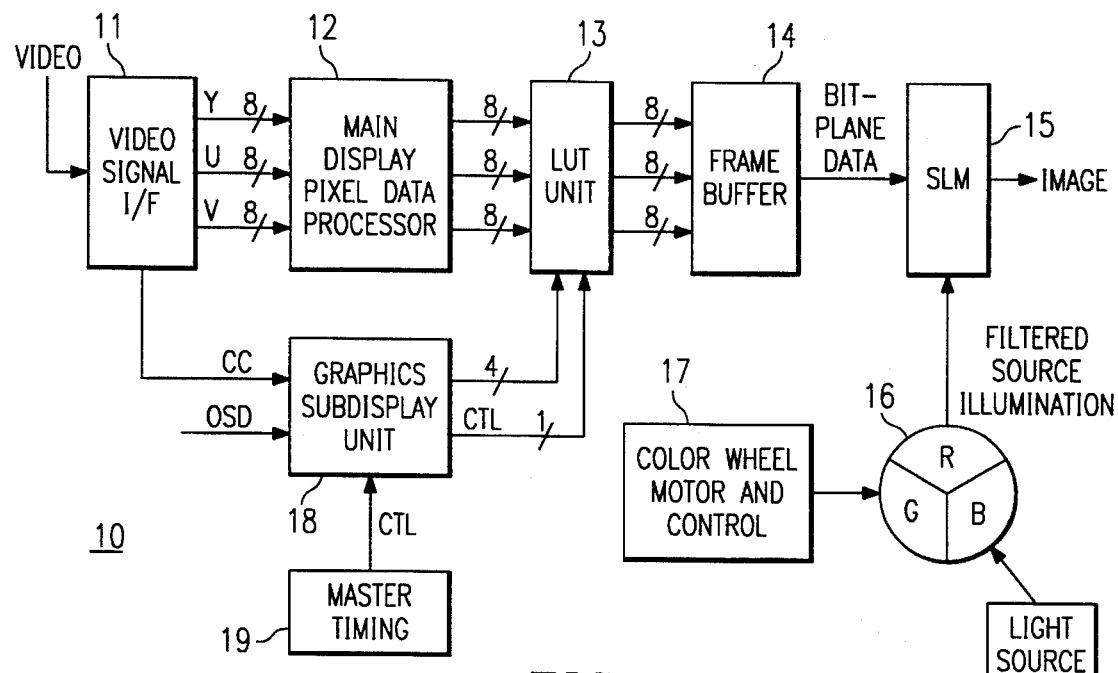
FIG. 1 is a block diagram of a digital television system having a graphics subdisplay unit and a look-up table unit in accordance with the invention.

FIG. 1 is a block diagram of a digital display system 10. In the example of this description, display system 10 is a television system which receives an incoming analog television signal, referred to herein as the "video" signal. However, display system 10 could be some other type of video display system that receives or generates pixel data for a main display.

Television system 10 also receives a graphics input signal from one or more sources. If the signal is not already in pixel data format, system 10 converts it to pixel data. For purposes of this description, any data to be overlaid as a subdisplay, is referred to as "graphics" data as opposed to the "video" data that comprises the main display.

Television system 10 processes video data and graphics data along separate paths. If a subdisplay is to be displayed, the two types of data are combined prior to input to a look-up table (LUT) unit 13.

The system of FIG. 1 is a digital spatial light modulator (SLM) system, as opposed to a cathode ray tube (CRT) system. Accordingly, the data need not be reconverted to analog form for CRT display. Instead, the data is provided in whatever digital format is called for by the SLM. Also, it assumed that the SLM is a linear device, and does not require the gamma correction that is part of today's analog television signals. Thus, LUT unit 13 "linearizes" video data by mapping gamma-corrected data to data from which the gamma correction is undone. Together with subdisplay unit 18, LUT unit 13 provides either video data for an all-video display or a combination of video data and graphics data for a display of video overlaid with graphics.

The following overview of the various components of display system 10 provides details helpful to understanding of the invention. Further details pertaining to SLM-based image display systems, without the graphics subdisplay system of the present invention, set out in U.S. Pat. No. 5,079,544, entitled "Standard Independent Digitized Video System", and in U.S. Pat. Ser. No. 08/146,385, entitled "DMD Display System". Each of these patents is assigned to Texas Instruments, and each is incorporated herein by reference.

Signal interface 11 receives a video input signal. For purposes of example herein, it will be assumed that the input signal is a standard video signal that has been gamma-corrected. Interface 11 separates the video signal from synchronization and audio signals. It includes a Y/C separator, which separates the luminance data from the chrominance data, and A/D converters, which sample the signals to provide n-bit video data samples. In the example of this description, the samples are 8-bit YUV values, and provide 8 bits of data for each of three colors.

Pixel data processor 12 prepares the video data for display, by performing various processing tasks. Processor 12 includes processing memory for storing program instructions or data. The tasks performed by processor 12 include colorspace conversion and may include other tasks such as scaling or line generation. Colorspace conversion converts the YUV data to RGB data. Line generation can be used to convert interlaced fields of data into complete frames by generating new data to fill in odd or even lines. The order in which these tasks are performed may vary.

Look-up table (LUT) unit 13 is explained in detail in connection with FIG. 2. It is specially designed to deliver display-ready video data to frame buffer 14, and if a subdisplay is called for, it also provides display-ready graphics data. Although this description is in terms of a LUT unit 13 that performs de-gamma mapping, the same concepts would apply if LUT unit 13 performed some other mapping function.

Frame buffer 14 receives the display-ready pixel data from LUT unit 13. Frame buffer 14 formats the data, on input or on output, into "bit-plane" format and delivers the bit-plane data to SLM 15. The bit-plane format provides one bit at a time for each pixel of SLM 15 and permits each pixel to be turned on or off accordance to the value of that bit. For example, where each pixel is represented by 8 bits for each of three colors, there will be 3×8=24 bit-planes per frame. In a typical display system 10, frame buffer 14 is a double-buffer memory, which means that it has a capacity for at least two display frames. The buffer for one display frame can be read out to SLM 15 while the buffer or another display frame is being written. The two buffers are controlled in a "ping-pong" manner so that data is continuously available to SLM 15. Typically, frame buffer 14 is comprised of VRAM (video random access memory) devices. Further description of the structure and operation of frame buffer 14 are set out in U.S. Pat. No. 5,307,056, entitled "Dynamic Memory Allocation for Frame Buffer for Spatial Light Modulator" to Urbanus, et al., assigned to Texas Instruments Incorporated.

SLM 15 may be any type of SLM. For purposes of example, this description is in terms of an SLM that is a digital micro-mirror device (DMD). A DMD has an array of hundreds or thousands of tiny tilting mirrors, each of which represents one pixel. To permit the mirrors to tilt, each is attached to one or more hinges mounted on support posts, and spaced by means of an air gap over underlying control circuitry. The control circuitry provides electrostatic forces, which cause each mirror to selectively tilt. For display applications, image data is loaded to memory cells of the DMD and in accordance with this data, mirrors are tilted so as to either reflect light to, or deflect light from, the image plane.

One approach to providing color images in an SLM-based display system is to alternately address all pixels of a frame of the image with a different color. For example, each pixel might have a red, a green, and a blue value. Then, during each frame period, the pixels of that frame are addressed with their red, blue, then green data, alternatingly. A color wheel 16 having three segments of these same colors is synchronized to the data so that as the data for each color is displayed by the SLM 15, the light incident on the SLM 15 is filtered by the color wheel. For standard display rates of 60 frames per second, the eye perceives the image as having the proper color.

To permit each pixel to be represented by values with more than one bit for each color, various modulation schemes can be used to vary the intensity of each color. For example, each pixel might have a 24-bit value, 8 bits for each color. This permits $2^8=256$ levels of intensity for each color.

Color wheel 16 is driven by a motor 17 with a controller for both speed and phase. Master timing unit 19 provides various system control functions.

Graphics Subdisplay Unit and De-Gamma Unit

Figure 2:
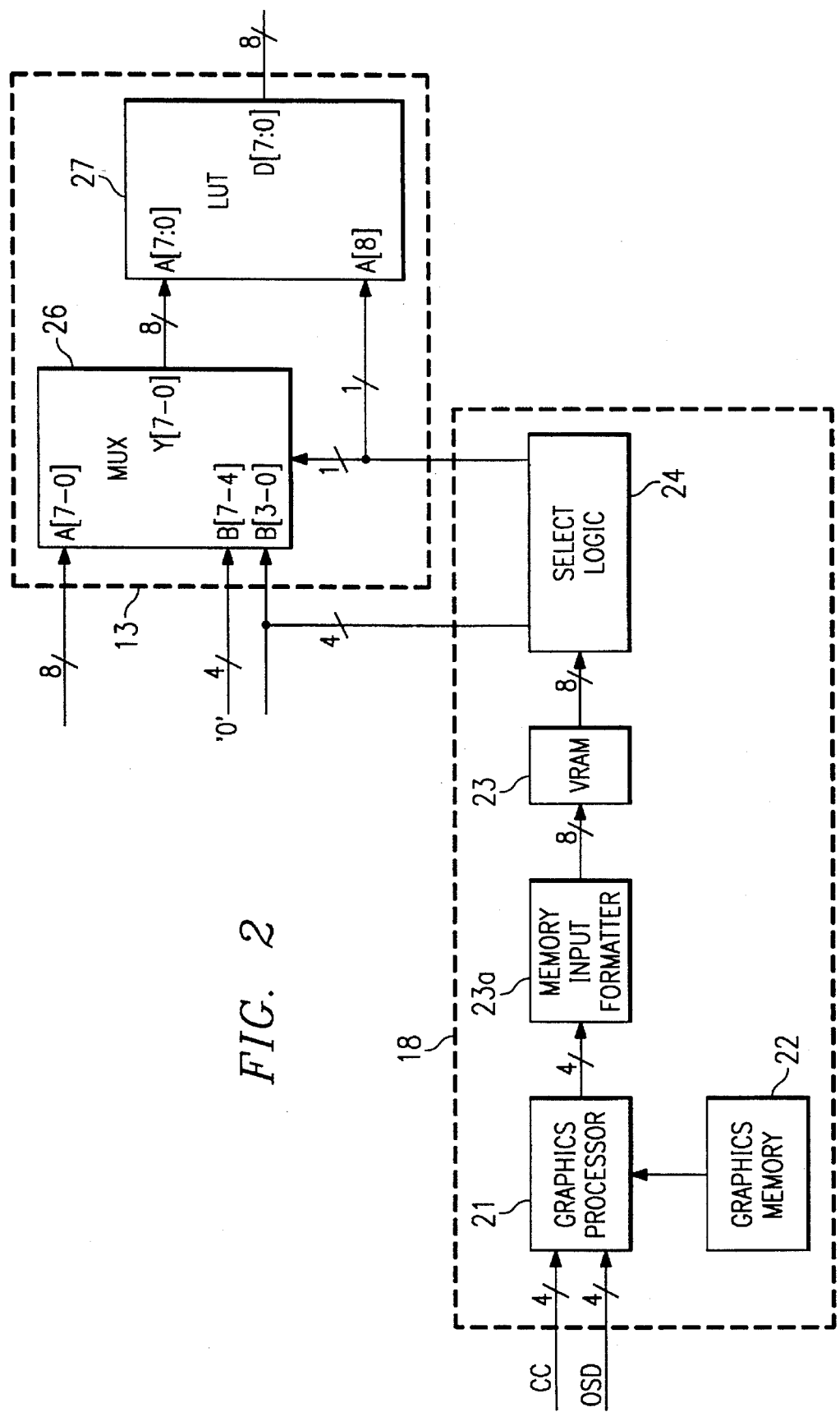
FIG. 2 is a block diagram of the graphics subdisplay unit and the look-up table unit of FIG. 1.

FIG. 2 is a block diagram of LUT unit 13 and of graphics subdisplay unit 18. As explained below, the basic function of graphics subdisplay unit 18 is to provide a control signal to LUT unit 13 that indicates whether a subdisplay is to be displayed, and if so, to provide graphics data in pixel format. LUT unit 13 is especially designed to operate on only the appropriate data for each frame to be displayed so that it delivers display-ready video data, and if there is to be a subdisplay, display-ready graphics data.

To obtain closed caption (CC) data, graphics subdisplay unit 18 samples the luminance (Y) component of the video input signal. To obtain on-screen display (OSD) data, graphics processor 18 may receive $I^2C$ input, which is a format known in the field of digital television. Alternatively, OSD data could arrive from other input sources.

Graphics processor 21 is programmed for whatever processing is applicable to the input graphics data. It is associated with a processing memory 22 which stores program code and data during processing. The tasks of processor 21 may include decoding closed caption or on-screen information, accessing font data in memory 22, and picture quality control processing.

In the example of this description, the graphics data provided by processor 21 is 4-bit data, such that each pixel to be displayed is represented by 4 bits.

A feature of the invention is that one of the values that can be assigned to each graphics data value is a "transparent" value. This value indicates that no graphics data is to be displayed. In the example of this description, one value of the 16 possible values available to be assigned to a 4-bit value is the transparent value. For example, the value "1111" might represent "transparent". The other 15 values represent varying levels of intensity. The transparent value is assigned by processor 21, in response to external control input, such as a user-controlled signal that determines whether closed-caption is to be displayed.

Graphics processor 21 delivers processed graphics data to bit-map memory 23. Memory 23 stores data in bit-map format, which means that each pixel of the frame of data to be displayed is represented by a graphics data value. As stated above, in the example of this description, these values are each 4 bits.

Commercially available memory devices store words of 8-bits or more. Using such devices, a typical capacity of memory 23 is 128 kilobytes by 8 bits, which is equivalent to a capacity of 256 kilobytes by 4 bits of 4-bit graphics data. The size of memory 23 is sufficient to store the data for the subdisplay within one video frame.

In the example of this description, the word size of memory 23 (8 bits) exceeds the size of the graphics data values (4 bits). In general, for 4-bit graphics data, if memory 23 stores 4(n)-bit words, an input formatter 23a is used to group the 4-bit "nibbles" into the word size used by memory 23. For example, for an 8-bit memory 23, 4-bit "nibbles" to memory 23 could be alternately delivered to a latch and to the memory input bus, such that they become coupled as 8-bit words. As explained below, at the output of memory 23, a select logic unit 24 decouples these 4-bit "nibbles."

Preferably, memory 23 is a video random access memory (VRAM), which is a device commercially available from Texas Instruments Incorporated. These VRAM devices solve the problem of access to a high resolution frame buffer by including an internal parallel-in serial-out shift register that can be accessed independently from the rest of the memory unit. In one memory cycle, an entire row of pixel data is transferred from memory to the shift register. During read-out from the shift register, the memory is free to be written to. An example of a VRAM device is that TMS4161 integrated circuit, manufactured by Texas Instruments Incorporated. The shift register is as wide as the memory array and can be parallel loaded by asserting a transfer signal while a row of memory is being read. The serial register has its own data clock, enabling it to transfer data out of the chip at high speeds. Other VRAM devices may be used, with the important characteristic being a configuration similar to a random access memory (RAM), but with a parallel-in serial-out data register at a second data port.

Select logic unit 24 receives graphics data from memory 23, which in the example of this description is delivered in 8-bit words due to the configuration of memory 23. Each 8-bit word consists of two 4-bit graphics data values. Therefore, one function of select logic unit 24 is to toggle between these values so as to deliver the proper value to de-gamma unit 13 at the proper time. In other words, select logic unit 24 delivers first the left nibble, then the right nibble, of a first word, then the left nibble, then the right nibble of a second word, etc.

Select logic unit 24 also compares the graphics data value to a predetermined "transparent" value. The 1-bit result of the comparison is delivered to LUT unit 13, indicating on a pixel-by-pixel basis, whether or not a graphics subdisplay is to be displayed.

Of course, it is possible that memory 23 might store 4-bit words, in which case select logic unit 24 need only perform the comparison function. In this case, graphics data could be delivered directly to multiplexer 26 as well as to select logic unit 24.

Figure 3:
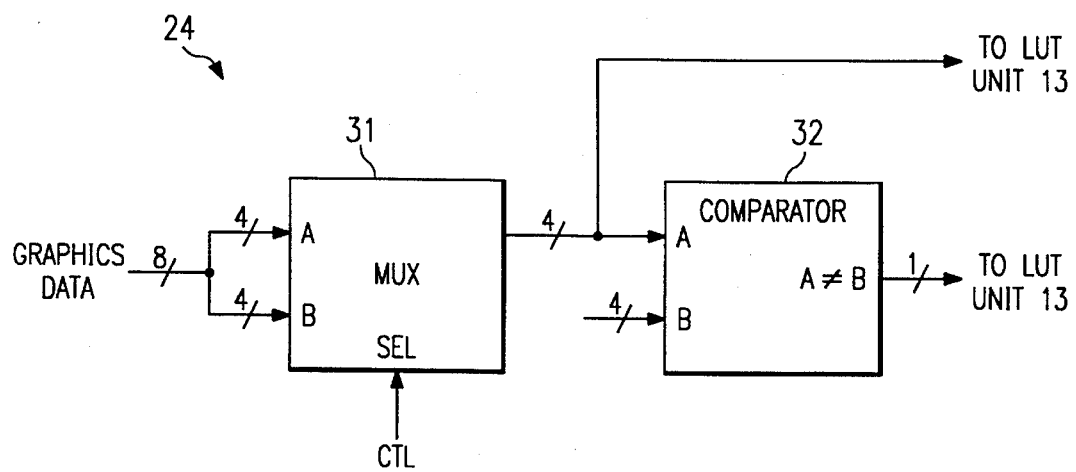
FIG. 3 is a block diagram of one embodiment of the select logic unit of FIG. 2.

FIG. 3 illustrates one embodiment of select logic unit 24, used in a system having a memory 23 that stores multiple graphics data values in each word. Specifically, in the example of this description, memory 23 stores two 4-bit graphics data values as an 8-bit word. Therefore, select logic unit 24 has a multiplexer 31 which toggles between these two values. The selection is controlled by an appropriate control signal, which could come, for example, from timing unit 19.

As shown in FIG. 3, the 4-bit graphics data values are delivered to a comparator 32, which compares the value to the "transparent" value. The output of comparator 32 is "0" if a match is made, and "1" if there is no match.

Referring again to FIG. 2, the 4-bit graphics data and the 1-bit control value from graphics unit 18 are delivered to LUT unit 13. FIG. 2 illustrates one channel of LUT unit 13, comprised of a multiplexer 26 and a look-up table (LUT) 27. In actuality, there would be a multiplexer 27 and a LUT 27 for each of three channels, each channel for 8-bit values of a different color.

LUT multiplexer 26 is a 2:1 by 8 multiplexer. It receives 4-bit graphics data from select logic unit 24, at a first input port. It receives 8-bit video data values from pixel-data processor 12 at a second input port. To provide 8-bits at the graphics data input, an additional 4-bits may be appended to each 4-bit graphics data value by hardwiring the upper 4 input lines of the graphics data input with "0" values. Or, the values for the upper 4-bits of graphics data may be treated as "don t care" values.

Multiplexer 26 receives the 1-bit control value from select logic 24, which indicates which type of data multiplexer 26 will deliver to LUT 27. In the example of this description, if the 1-bit control value from select logic is "0", it delivers video data, whereas if the control value is "1", it delivers graphics data.

LUT 27 receives either 8-bit video data or 8-bit graphics data from multiplexer 26. LUT also receives the 1-bit control value from select logic unit 24.

LUT 27 has a main area of 256 bytes, for mapping gamma-corrected video data to linearized data. LUT 27 also has another area of 15 bytes, for mapping graphics data to any one of a range of 256 output values.

A 9-bit address, eight bits from multiplexer 26 and the ninth bit from select logic 24, is used to address LUT 27. Each 8-bit video data value from multiplexer 26 represents a look-up table address at locations 0 to 255. Bit 8 represents an address at locations 256 to 271, with one location being associated with the transparent value and therefore unused. Thus, if the bit from select logic 26 is "0", indicating that the 4-bit graphics data value is "transparent", LUT 27 uses addresses 0–255 to perform its normal video data mapping. However, if the bit from select logic 24 is "1", indicating that the 8-bit graphics data value is one of 15 intensity values, LUT 27 uses 15 addresses from locations 256–271 for its mapping. An advantage of using LUT 27 in this manner is that an 8-bit output color is available for any 4-bit input value.

The output of LUT 27 is display-ready data. It may be all video data, if there is to be no subdisplay, or it may be a combination of video and graphics data. Referring again to FIG. 1, this display-ready data is formatted in a manner appropriate for the SLM.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A graphics subsystem, used in a digital display system, for providing pixel data for a video display that may be overlaid with a graphics subdisplay, comprising:

a graphics processor for processing graphics data in a pixel format, and for assigning values to said graphics data such that one value of each pixel may be a transparent value indicating that no graphics data is to be displayed for that pixel;

a memory for storing said graphics data;

a select logic unit for receiving said graphics data from said memory, and for detecting whether each value of said graphics data is said transparent value, and for generating a corresponding control signal;

a multiplexer for receiving video data in pixel format from a video data path of said display system, for receiving said graphics data either directly from said memory or from said select logic unit, and for selecting between said video data and said graphics data depending on the value of said control signal; and a look-up table unit for receiving video data or graphics data from said multiplexer, and for mapping said video data or said graphics data with an appropriate mapping function depending on the value of said control signal.

2. The subsystem of claim 1, wherein said memory is a video random access memory.

3. The subsystem of claim 1, wherein said memory stores words the size of a multiple of the size of said graphics data, and wherein said select logic unit further comprises logic circuitry for toggling said graphics data from said words, and for delivering said graphics data to said multiplexer.

4. The subsystem of claim 1, wherein said memory stores words the size of said graphics data, and wherein said memory receives said graphics data directly from said memory.

5. The subsystem of claim 1, wherein said video data path has three channels, one for each of three colors, each having said multiplexer and wherein said look-up table unit comprises a look-up table for each of said channels.

6. The subsystem of claim 1, wherein said look-up table maps said video data to linearized video data and maps said graphics data to different colors.

7. The subsystem of claim 1, wherein said look-up table has input addresses corresponding to the values of said video data and the value of said control signal.

8. A method of providing pixel data for a video display that may be overlaid with a graphics subdisplay, comprising the steps of receiving input data representing a graphics image to be displayed;

processing said input data into graphics data in pixel format, wherein at least one value of each pixel may be a transparent value indicating that no graphics data is to be displayed for that pixel;

detecting whether said graphics data has said transparent value and generating a corresponding control signal;

selecting between said video data and said graphics data, depending on the value of said control signal; and mapping the selected video data or graphics data to display-ready video data or graphics data.

9. The method of claim 8, further comprising the step, after said processing step, of storing said graphics data in a memory.

10. The method of claim 9, wherein said storing step is performed with a memory that stores words having a size of a multiple of the size of said graphics data, and further comprising the step of toggling between said graphics data before said selecting step.

11. The method of claim 8, wherein said mapping step is performed with a look-up table.

12. The method of claim 8, wherein said mapping step is performed with a different mapping function for said video data and said graphics data, selected in response to said control signal.

13. The method of claim 8, wherein said mapping step is performed by converting said video data to linearized video data.

14. The method of claim 8, wherein said mapping step is performed by converting said graphics data into color graphics data.

15. A digital display system for displaying main displays of video data and subdisplays of graphics data, comprising:

a video interface for receiving a video input signal, and for converting said input video signal to video data in pixel format;

a video data processor for receiving said video data in pixel format from said interface and for performing one or more pixel data processing tasks;

a graphics subdisplay unit for receiving a graphics input signal, for converting said graphics signal to graphics data in pixel format, for processing said graphics data, for assigning a value to each graphics data value indicating whether graphics data values are "transparent", and for generating a control signal indicating when any graphics data value is transparent;

a look-up table unit for receiving video data from said video data processor and graphics data from said video data processor and for selecting either said video data or said graphics data in accordance with said control signal, and for performing a mapping function on the selected data thereby generating display-ready pixel data;

a display memory for receiving said display-ready pixel data from said look-up table unit, and for delivering data a spatial light modulator in a format appropriate for said spatial light modulator; and a spatial light modulator for generating images in accordance with said data from said display memory.

16. The digital television system of claim 15, wherein said spatial light modulator is a digital micro-mirror device.

17. The digital television system of claim 15, wherein said graphics subdisplay unit generates said control signal with a comparator.

18. The digital television system of claim 15, wherein said graphics subdisplay unit stores said graphics data in words having a larger size than the size of said graphics data, and has circuitry for toggling said words.

19. The digital television system of claim 15, wherein said look-up table unit has a multiplexer, at the input to a look-up table for selecting between said video data or said graphics data.

20. The digital television system of claim 15, wherein said look-up table unit maps said video data to linearized video data.

* * * * *